United States Patent
Durham

(10) Patent No.: US 10,678,636 B2
(45) Date of Patent: Jun. 9, 2020

(54) TECHNIQUES FOR DETECTING AND CORRECTING ERRORS IN DATA

(71) Applicant: INTEL CORPORATION, Santa Clara, CA (US)

(72) Inventor: David M. Durham, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 141 days.

(21) Appl. No.: 15/908,205

(22) Filed: Feb. 28, 2018

(65) Prior Publication Data

US 2019/0042359 A1 Feb. 7, 2019

(51) Int. Cl.
*G11C 29/00* (2006.01)
*G06F 11/10* (2006.01)
*H04L 9/06* (2006.01)
*G09C 1/00* (2006.01)
*G11C 29/52* (2006.01)
*G11C 29/04* (2006.01)

(52) U.S. Cl.
CPC ...... *G06F 11/1068* (2013.01); *G06F 11/1076* (2013.01); *G09C 1/00* (2013.01); *H04L 9/0618* (2013.01); *G11C 29/52* (2013.01); *G11C 2029/0411* (2013.01); *H04L 2209/12* (2013.01); *H04L 2209/34* (2013.01)

(58) Field of Classification Search
CPC .... G06F 11/1068; H04L 9/0618; G11C 29/52
See application file for complete search history.

(56) References Cited

U.S. PATENT DOCUMENTS

| | | | | | |
|---|---|---|---|---|---|
| 5,717,461 | A | * | 2/1998 | Hoogenboom | H04N 19/61 375/240.25 |
| 5,745,509 | A | * | 4/1998 | Marchand | G11B 20/1809 714/786 |
| 8,245,087 | B2 | * | 8/2012 | Abts | G06F 11/106 714/54 |
| 8,666,187 | B2 | * | 3/2014 | Arakawa | H04N 5/781 382/252 |
| 8,775,863 | B2 | * | 7/2014 | Moyer | G06F 11/073 711/133 |
| 8,843,791 | B2 | * | 9/2014 | Mittal | G06F 11/073 714/48 |
| 9,672,110 | B1 | * | 6/2017 | Patel | G06F 11/1092 |

(Continued)

*Primary Examiner* — Esaw T Abraham

(57) ABSTRACT

Various embodiments are generally directed to techniques for managing errors in data, such as with error-correcting code (ECC), for instance. Some embodiments are particularly directed to providing one or more of error detection, location, and correction for a set of storage memory devices with a management memory device. In one or more embodiments, each of the storage and management memory devices may include a memory chip, such as one of a set of memory chips included in a dual in-line memory module (DIMM). For instance, each memory device be a dynamic random-access memory (DRAM) integrated circuit included in a DIMM. In various embodiments, the set of storage management memory devices may be used to store a memory line, such as an evicted cache line. In many embodiments, cryptographically secure memory encryption and/or integrity may also be provided for the set of storage memory devices with the management memory device.

25 Claims, 11 Drawing Sheets

(56) References Cited

U.S. PATENT DOCUMENTS

| | | | |
|---:|---:|---|---|
| 9,946,607 B2* | 4/2018 | Sundararaman | G06F 11/1458 |
| 10,320,557 B2* | 6/2019 | Karkkainen | H04L 9/0637 |
| 2008/0163007 A1* | 7/2008 | Shaeffer | G06F 11/1004 |
| | | | 714/52 |
| 2011/0138219 A1* | 6/2011 | Walton | G06F 11/0712 |
| | | | 714/3 |
| 2013/0028021 A1* | 1/2013 | Sharon | G11C 11/5642 |
| | | | 365/185.17 |
| 2014/0223239 A1* | 8/2014 | Mittal | G06F 11/073 |
| | | | 714/42 |

\* cited by examiner

Identify a memory line comprising a set of data blocks to store in a set of storage memory devices included in a memory module, the set of data blocks including one data block for each storage memory device in the set of storage memory devices
652

Combine the set of data blocks into a block correction at least in part via an exclusive or (XOR) operator
654

Determine an encoded block correction from the block correction with a bit encoder
656

Store the encoded block correction in a management memory device included in the memory module
658

*900*

TECHNIQUES FOR DETECTING AND CORRECTING ERRORS IN DATA

BACKGROUND

Generally, managing errors in data can include error correction techniques in data storage and communication. Error correction may refer to the practice and study of techniques for identifying and/or correcting errors that occur in data. In computer technology, error correction may be utilized to detect and correct data corruption, such as with error-correcting code (ECC) memory. Data corruption may refer to errors in computer data that occur during writing, reading, storage, transmission, or processing, which introduce undesired changes to the original data. In the absence of error correcting techniques, data corruption may cause data loss and/or system failure. Typically, ECC memory can correct for single-bit errors. For instance, ECC memory may include additional bits to record parity that can be used to detect single-bit errors.

BRIEF DESCRIPTION OF THE DRAWINGS

FIG. 6B illustrates an embodiment of a fourth logic flow.

DETAILED DESCRIPTION

Figure 1:
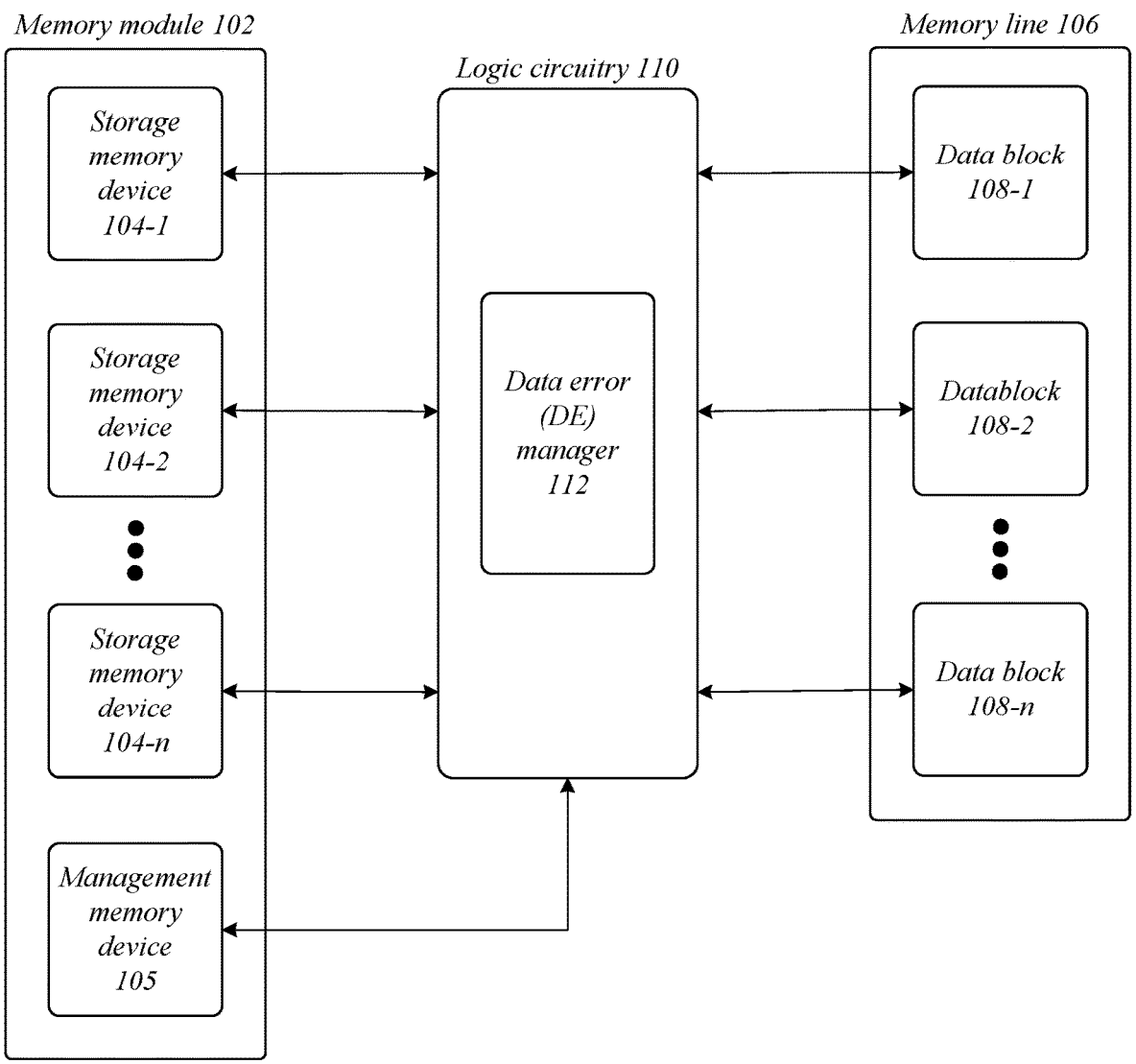
FIG. 1 illustrates an embodiment of a first operating environment.

Various embodiments are generally directed to techniques for managing errors in data, such as with error-correcting code (ECC), for instance. Some embodiments are particularly directed to providing one or more of error detection, location, and correction for a set of storage memory devices with a management memory device. In one or more embodiments, each of the storage and management memory devices may include a memory chip, such as one of a set of memory chips included in a dual in-line memory module (DIMM). For instance, each memory device be a dynamic random-access memory (DRAM) integrated circuit included in a DIMM. In various embodiments, the set of storage management memory devices may be used to store a memory line, such as an evicted cache line. In many embodiments, cryptographically secure memory encryption and/or integrity may also be provided for the set of storage memory devices with the management memory device. Other embodiments are described and claimed.

In one embodiment, for example, an apparatus may comprise a memory with a set of storage memory devices and a management memory device as well as logic for a data error manager, the logic implemented at least partially in circuitry. In various embodiments, the logic may retrieve a set of encoded data blocks associated with a memory line from the set of storage memory devices and a encoded block correction from the management memory device. In various such embodiments, the set of encoded data blocks may include one encoded data block for each storage memory device in the set of storage memory devices. In some embodiments, the logic may determine a set of decoded data blocks comprising the memory line from the set of encoded data blocks and a decoded block correction from the encoded block correction and combine the set of decoded data blocks into a validation block correction via an exclusive or (XOR) operator. In some such embodiments, the logic may compare the decoded block correction and the validation block correction to identify one or more bit errors in the memory line when the decoded block correction and the validation block correction are different.

Some challenges facing the management of data errors include the inability to provide error detection, location, and correction without excessive memory overhead. These challenges may result from an ECC memory requiring two or more management memory devices to enable error corrections for a set of storage memory devices. In various embodiments, a first management memory device may be used to locate bit errors and a second management memory device may be used to store parity bits to correct bit errors. In various such embodiments, each memory device may include a memory chip, such as in a dual in-line memory module, resulting in two additional memory chips being required to support error correction. For instance, the fifth generation of double data rate synchronous dynamic random-access memory (DDR5) may utilize eight storage memory devices on a DIMM to store memory lines and two management memory devices for ECC (e.g., one for parity and one for error location).

Adding further complexity, ECC memory may not be secure. As such, a malicious user may be able to reverse the ECC algorithm and flip bits that could allow modified or corrupted data to pass undetected. In other embodiments, making ECC memory cryptographically secure may require additional memory, such as to store message authentication codes (MACs). For example, software guard extensions (SGX) may require 25% memory overhead for MAC storage while reducing performance 2× due to extra memory reads/writes to manage the MACs due to twice the bandwidth overhead. These and other factors may result in management of data errors with deficient performance, excessive overhead, insufficient data security, and increased costs (e.g., additional memory chips required, more wiring, and increased complexity). Such limitations can drastically reduce the capabilities, usability, and applicability of data error managers, contributing to inefficient systems with limited capabilities, undesirable features, and higher costs.

Various embodiments described herein include a data error manager that is able to provide error detection, location, and correction for a memory with a single management memory device in a memory module, such as a DIMM. In one or more embodiments, the data error manager may be able to detect, locate, and correct simultaneous errors on multiple storage memory devices. In many embodiments, cryptographically secure memory encryption and/or integrity may additionally, or alternatively, be provided for the set of storage memory devices with the single management device. For example, the data error manager may implement one or more of these features via a single management memory device. In some embodiments, ECC may be combined with a cryptographically strong message authentication code (MAC) that cannot be circumvented by either random errors or adversarial attacks on physical memory (e.g., via a logic probe, field programmable gate array (FPGA), man-in-the-middle attack on the memory bus, processor to processor interconnect, etc.). In these and other ways the data error manager may enable quick and efficient error corrections and/or memory protections to achieve improved memory efficiency and performance with increased capabilities as well as reduced memory hardware and bandwidth requirements, resulting in several technical effects and advantages. For instance, ECC memory can be offered at a lower cost, resulting in reduced server costs while providing a security advantage with memory encryption with cryptographic integrity.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers, integrated circuits (ICs), logic devices, or the like as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an example of an operating environment 100 that may be representative of various embodiments. Operating environment 100 may include a memory module 102 with storage memory devices 104-1, 104-2, 104-*n* and management memory device 105, logic circuitry 110 with data error (DE) manager 112, and memory line 106 with data blocks 108-1, 108-2, 108-*n*. In one or more embodiments, DE manager 112 may provide error correction for data stored in memory module 102, such as by generating and storing data in management memory device 105 with ECC implemented via logic circuitry 110. In one or more such embodiments, error correction may include one or more of detection, location, and correction of errors in memory module 102. In many embodiments, DE manager 112 may also, or alternatively, provide cryptographically secure memory encryption and integrity for data stored in memory module 102 via management memory device 105. In various embodiments described herein, DE manager 112 may provide one or more of error detection, location, correction, encryption, and integrity for data stored in memory module 102 via a single management memory device (e.g., management memory device 105). In various such embodiments, this may enable a more efficient system with fewer resource demands. In some embodiments, DE manager 112 may be able to detect, locate, and correct multiple errors in a single device and/or simultaneous errors on multiple memory devices. Embodiments are not limited in this context.

In one or more embodiments, memory line 106 may logically represent data for storage in memory module 102. For instance, memory line 106 may include a cache line that has been evicted from a processor cache and needs to be stored in memory module 102 (e.g., random access memory (RAM)) or a cache line that needs to be loaded/retrieved from memory and placed into the processor cache. In many embodiments, data blocks 108-1, 108-2, 108-*n* (or data blocks 108) may represent portions of the memory line 106, such as memory rows. In various embodiments, data representing each of data blocks 108 may be stored in corresponding storage memory devices 104-1, 104-2, 104-*n* (or storage memory devices 104). For example, DE manager 112 may perform a bit encoding operation on data block 108-1 and store the result in storage memory device 104-1, then perform a bit encoding operation on data block 108-2 and store the result in storage memory device 104-2, and so on for each data block in the memory line.

Accordingly, in some embodiments, the number of data blocks 108 in memory line 106 may equal the number of storage memory devices 104 in memory module 102. In many embodiments, DE manager 112 may store data, such as block corrections, in management memory device 105 to enable one or more of error detection, location, correction, encryption, and integrity for data stored in memory module 102. In many such embodiments, the data stored in management memory device 105 may be based on data in memory line 106. Some embodiments may be directed to techniques for multi-domain memory encryption, such as with a plurality of cryptographically isolated domains, for instance. Some such embodiments may be particularly directed to a multi-domain encryption system that provides one or more of memory encryption, integrity, and replay protection services to a plurality of cryptographic domains.

In various embodiments, memory module 102 may include computer memory that includes a plurality of memory chips that can be represented by storage memory devices 104 and management memory device 105. For instance, memory module 102 may include a DIMM with a set of memory chips. In some embodiments, multiple memory modules 102 (e.g., DIMMs) may be included in a computer. In some such embodiments, the collection of memory modules in a computer may be referred to as or included in the external memory of the computer.

In many embodiments, memory module 102 may include one or more of ECC memory, DDR memory, flash storage, hard drive storage, redundant array of independent disks (RAID) storage, flash memory, nonvolatile memory, 3D XPoint memory, and the like. In some embodiments, each memory device in memory module 102 may be the same or similar. For instance, distinctions between storage memory devices 104 and management device 105 may reside in the purpose they are used for. Therefore, in some such embodiments, whether a memory device is used as a management memory device or a storage memory device may be arbitrary and/or selectable.

From a redundancy perspective, the distinctions may be physical boundaries that represent the probable extent of a physical failure. For instance, one physical chip may fail, or its associated wiring, but not the adjacent physical chips or their associated wiring. In other embodiments, the physical boundaries may be defined within the physical device, such as a physical row, column, bank, or other adjacency of memory circuits. For example, in a RAID system, each storage memory device may be a separate hard drive (where a management memory device would be a separate driver used to correct other failing drives).

It will be appreciated that in one or more embodiments, various techniques described herein may be used in conjunction with technologies other than computer memory, such as communication protocols (e.g., wireless communications), without departing from the scope of this disclosure. For example, with respect to wireless communications, each storage memory device could be a different spectrum for frequency hopping wireless communication such that interference in one spectrum band is independent of interference in another spectrum band. In such example, the portion of the communication associated with interference in one spectrum band may be corrected using the same or similar correction techniques described herein within another spectrum band (e.g., by using information in a separate memory management device).

Figure 2:
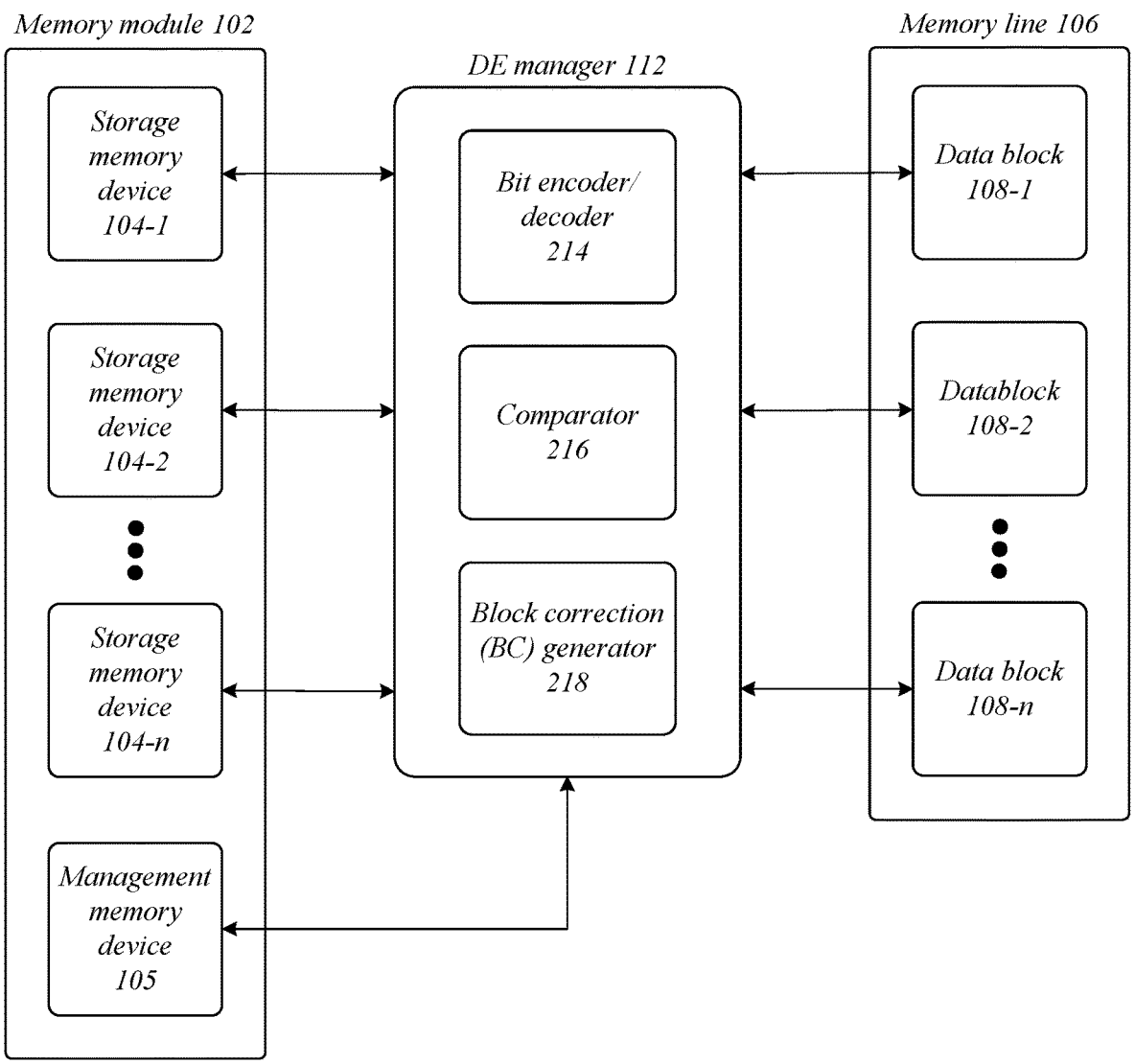
FIG. 2 illustrates an embodiment of a second operating environment.

FIG. 2 illustrates an example of an operating environment 200 that may be representative of various embodiments. Operating environment 200 may be the same or similar to operating environment 100, however, in operating environment 200, DE manager 112 may include bit encoder/decoder 214, comparator 216, and block correction (BC) generator 218. In some embodiments, DE manager 112 may implement ECC, such as via one or more of bit encoder/decoder 214, comparator 216, and BC generator 218. In one or more embodiments described herein, DE manager 112 may utilize bit encoder/decoder 214, comparator 216, and/or BC generator 218 to provide error correction for data stored in memory module 102. In one or more such embodiments, DE manager 112 may utilize management memory device 105 to store data used to enable the error detection, error correction, confidentiality, and/or integrity, such as data generated by one or more of bit encoder/decoder 214, comparator 216, and BC generator 218. For example, data, such as block corrections, may be generated and stored in management memory device 105 to allow detection and/or correction of data corruption associated with memory module 102 or memory line 106. Embodiments are not limited in this context.

In various embodiments, the DE manager 112 is able to provide error detection, location, correction, confidentiality, and/or integrity for the storage memory devices 104, at least in part by performing various logical operations on data blocks 108 with components of DE manager 112, such as bit encoder/decoder 214, comparator 216, and BC generator 218. In one or more embodiments, DE manager 112 may be able to detect, locate, and correct simultaneous errors on multiple storage memory devices (see e.g., FIG. 5). In many embodiments, DE manager 112 may implement one or more of these features via a single management memory device (e.g., management memory device 105). In many such embodiments, using a single management memory device to implement one or more of the features may reduce the resources required to implement the one or more features described herein. In some embodiments, DE manager 112 may combine ECC with a cryptographically strong message authentication code (MAC) that cannot be circumvented by either random errors or adversarial attack on physical memory (e.g., memory chips). In one or more embodiments, DE manager 112 may store the combined ECC and MAC in management memory device 105. In some embodiments, MACs may be used for memory integrity, providing a variety of usages including data corruption detection, memory access control, virtual machine isolation, and others.

In one or more embodiments, bit encoder/decoder 214 may be used to randomize/derandomize bits in a data block prior to the bits being stored in memory module 102. For example, data block 108-1 may be randomized to generate an encoded block that is stored in storage memory device 104-1. In some embodiments, the primary property required of data transformations by bit encoder/decoder 214 may be bit diffusion (permutation and distribution) such that a one-bit change in the input will on average flip 50% of the bits in the output. In various embodiments, bit encoder/decoder 214 may provide two-way operation such that any data transformations performed by bit encoder/decoder 214 may be reversible, such as in cryptography. For instance, data blocks 108 may be recovered from encoded data blocks stored in memory module 102. Some embodiments may include separate bit encoder and bit decoder components. In various embodiments, encoding and decoding may be inverse operations. Sometimes, encoding and decoding may be symmetric operations. Exemplary memory read and write flows will be described in more detail below, such as with respect to FIG. 3A and FIG. 3B.

In some embodiments, bit encoder/decoder 214 may utilize a cryptographic algorithm, such as a block cipher. In some such embodiments, one or more keys may be used by bit encoder/decoder 214 to encrypt/decrypt data, such as in conjunction with a block cipher. For example, bit encoder/decoder 214 may utilize a key to encrypt data block 108-1 prior to storage in memory module 102 and decrypt storage memory device 104-1 to enable recovery of memory line 106. Some embodiments may include separate encryption and decryption components. In various embodiments, encryption and decryption may be inverse operations. Sometimes, encryption and decryption may be symmetric operations.

In various embodiments, the block cipher input and output blocks may be the same size. In many embodiments, the block cipher input block may match the bit size of a data block in memory line 106. In many such embodiments, each data block 108 in memory line 106 may correspond to a row of memory line 106. In one or more embodiments, the block cipher output may match a bit size of a storage memory device. For instance, the block cipher output may match a memory devices size for a row of a stored memory line. In various embodiments, plaintext may be used to refer to one or more of decoded, nonencrypted, de-diffused, or decrypted data blocks or block corrections while ciphertext may be used to refer to one or more of encoded, diffused, or encrypted data blocks or block corrections.

In many embodiments, comparator 216 may be used to verify that data has not become corrupted, such as during a memory read. For instance, comparator 216 may compare values, such as block corrections, to ensure data has not changed. In many embodiments, BC generator 218 may be used to generate values that enable error correction on memory module 102, such as block corrections. In some embodiments, the block corrections may provide the functionality of a parity bit, such as with respect to ECC. In various embodiments, BC generator 218 may provide two-way operation such that any data transformations performed by BC generator 218 may be reversible.

In one or more embodiments, BC generator 218 may generate a block correction by performing logical operations on memory line 106. For instance, a block correction may be generated by XORing the plaintext in each of data blocks 108 together. In such instances, XOR operators or operations may be used to generate block corrections because XOR operations are order independent (commutative and associative) and there is no overflow/carry (i.e., input and output are the same size). Also, an XOR operation may be the same as an addition operation on integers modulo 2. However, additional or alternative data transformation may be used to generate a block correction. For example, some embodiments, may use addition, subtraction, multiplication, division, etc., but these will cause overflow/underflow and carry values. Thus, they many only work for some data (like small numbers) unless the overflow/underflow and carry values are accounted for. In another example, more transformations could be added to the XOR, such as additional bit permutations or even full diffusion with encryption. In a further example, more sophisticated implementations may use lossless compression, but this too is data dependent. Also, Hamming codes, code book substitutions, or similar may be used.

In various embodiments, DE manager 112 may store a block correction in management memory device 105 for each memory line stored in the set of storage memory devices 104. In one or more embodiments, bit encoder/decoder 214 may encode and/or encrypt the block corrections prior to storing them in management memory device 105. In various embodiments described herein, the block corrections may be used to correct bit errors in a memory line being read from memory module 102. Exemplary error correction flows will be described in more detail below, such as with respect to FIG. 4 and FIG. 5.

Figure 3A:
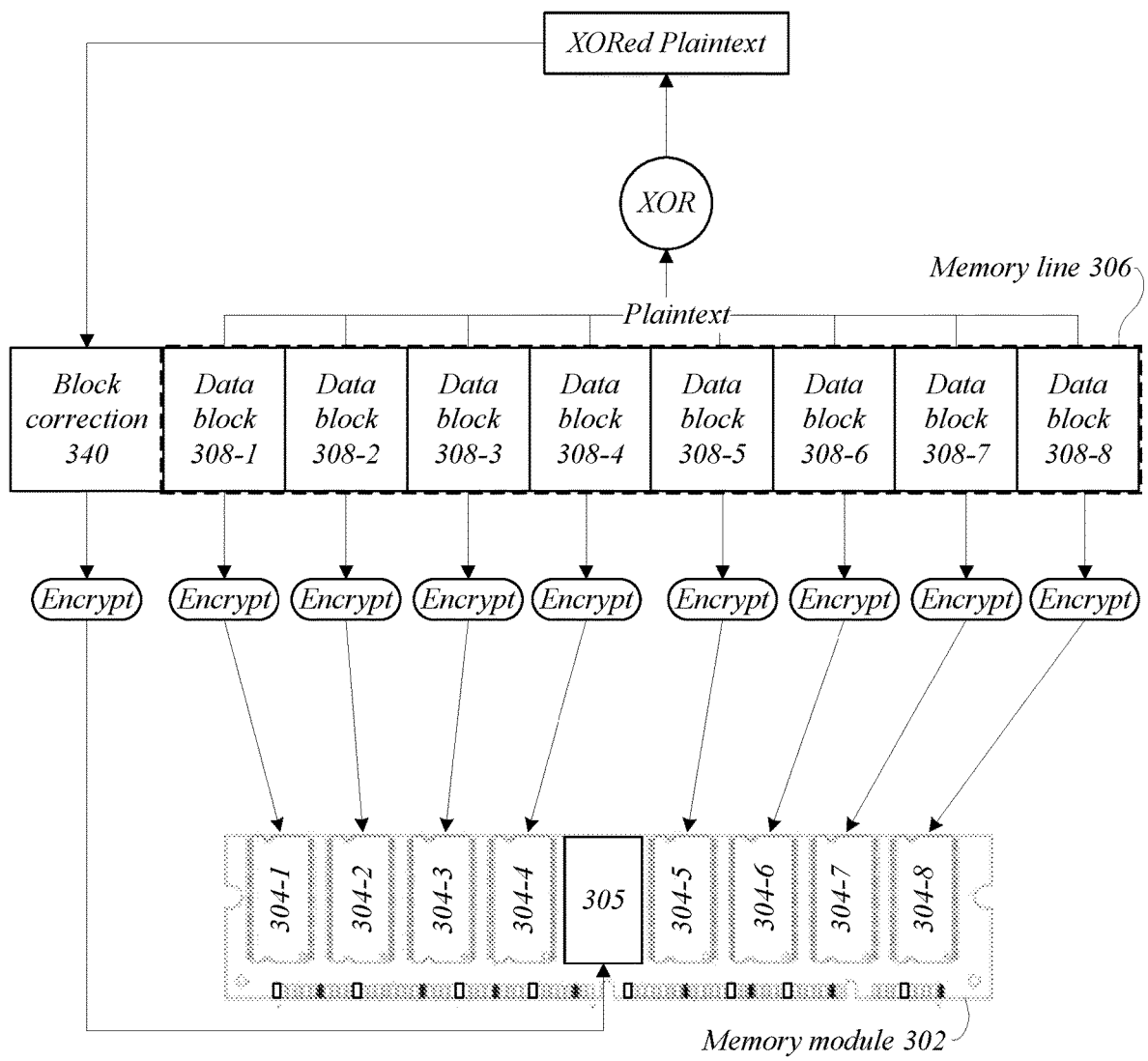
FIG. 3A illustrates an embodiment of a first processing flow.

FIG. 3A illustrates an example of a processing flow 300A that may be representative of a write flow of a memory line 306 to a memory module 302. In various embodiments, one or more components of processing flow 300A may be the same or similar to one or more components in FIG. 1-FIG. 2. For instance, memory module 302 may be the same or similar to memory module 102, management memory device 305 may be the same or similar to management memory device 105, and memory line 306 may be the same or similar to memory line 106. In various embodiments, processing flow 300A may be implemented by logic circuitry and/or a DE manager, such as logic circuitry 110 and/or DE manager 112. In one or more embodiments described herein, block correction 340 may be generated based on each of data blocks 308 in memory line 306. In one or more such embodiments, block correction 340 may enable one or more of error detection, location, correction, encryption, and integrity for data stored in memory module 302. Embodiments are not limited in this context.

In many embodiments, memory line 306 may represent an evicted cache line that needs to be stored in RAM, represented by memory module 302. For instance, memory line 306 may be evicted from a processor cache. In the illustrated embodiment, bit encoding/decoding operations may include encryption/decryption operations. As shown in FIG. 3A, memory line 306 may comprise data blocks 308-1, 308-2, 308-3, 308-4, 308-5, 308-6, 308-7, 308-8 (or data blocks 308). For instance, memory line 306 may include 64 bytes while each of data blocks 308 include 64 bits. In various embodiments, each of data blocks 308 may represent a row in memory line 306. In some embodiments, data blocks 308 may collectively include the plaintext of memory line 308. In one or more embodiments, each of data blocks 308 may be the same size. In many embodiments, block correction 340 may be the same size as each of data blocks 308.

In some embodiments, each of data blocks 308 may be XORed together to generate XORed plaintext, which may be equivalent to the block correction 340. In various embodiments, block correction 340 may be encrypted (e.g., via bit encoder/decoder 214 with a block cipher) and stored in management memory device 105. In other embodiments, block correction 340 and/or data blocks 308 may be diffused instead of encrypted according to defined standards. In other such embodiments, one or more of error detection, location and/or correction may be provided for data stored in memory module 302, however, security and/or integrity may not be guaranteed for data stored in memory module 302. In one or more embodiments, data blocks 308 may also be encrypted (e.g., via bit encoder/decoder 214 with a block cipher having a block size the same as the size of each of data blocks 308) and stored in respective storage memory devices 304. For example, encrypted data block 308-1 may be stored in storage memory device 304-1, encrypted data block 308-2 may be stored in storage memory device 304-2, encrypted data block 308-3 may be stored in storage memory device 304-3, and so on through encrypted data block 308-8 being stored in storage memory device 304-8. In various embodiments, data may be written or stored to memory module 102 through a memory controller.

As previously mentioned, in many embodiments, the block cipher input block may match the bit size of a data block in memory line 306. For instance, Simon64, Speck64, Prince, Data Encryption Standard (DES), or Triple DES (3DES) may represent ciphers that match the 64-bit block size for DDR5 memory. In another instance, Simon32 or Speck32 may represent ciphers that match the 32-bit block size for DDR4 memory devices. In yet another instance, advanced encryption standard (AES) may be used, such as in conjunction with storage memory devices with a device density of 128 bits per transaction. In embodiments in which security is not critical, or security is not as important as performance, reduced round block ciphers may be used (e.g., 2 rounds of AES instead of the recommended 10 rounds, etc.). In one or more embodiments, the block cipher output may match a bit size (e.g., number of bits) of a memory device (e.g., storage memory device 104-$n$). For instance, the block cipher output may match a memory devices size for a row of a stored memory line. Thus, the block cipher output size may correspond to the bits of a memory line contributed by a single memory device.

In various embodiments, encryption may be performed with a secret key. In some embodiments, encryption may be performed in accordance with multi-key total memory encryption (MKTME). In some such embodiments, the key to use in encryption operations may be determined, such as by DE manager 112, based on unused address bits or metadata that indicates which key to use, such as where the address corresponds to the physical address of the memory line. In many embodiments, using an incorrect key to decrypt data may cause an integrity violation and/or uncorrectable error. In various embodiments, the use of a wrong key may be detected in addition to or in place of detecting bit errors. Furthermore, in one or more embodiments, xor-encrypt-xor based tweaked-codebook mode with ciphertext stealing (XTS) mode, or other tweakable modes such as Liskov, Rivest, and Wagner (LRW), may be used. In one or more such embodiments, XTS mode may be used such that the memory address of each block is used as an additional tweak so all ciphertext data blocks will look different for different addresses.

Figure 3B:
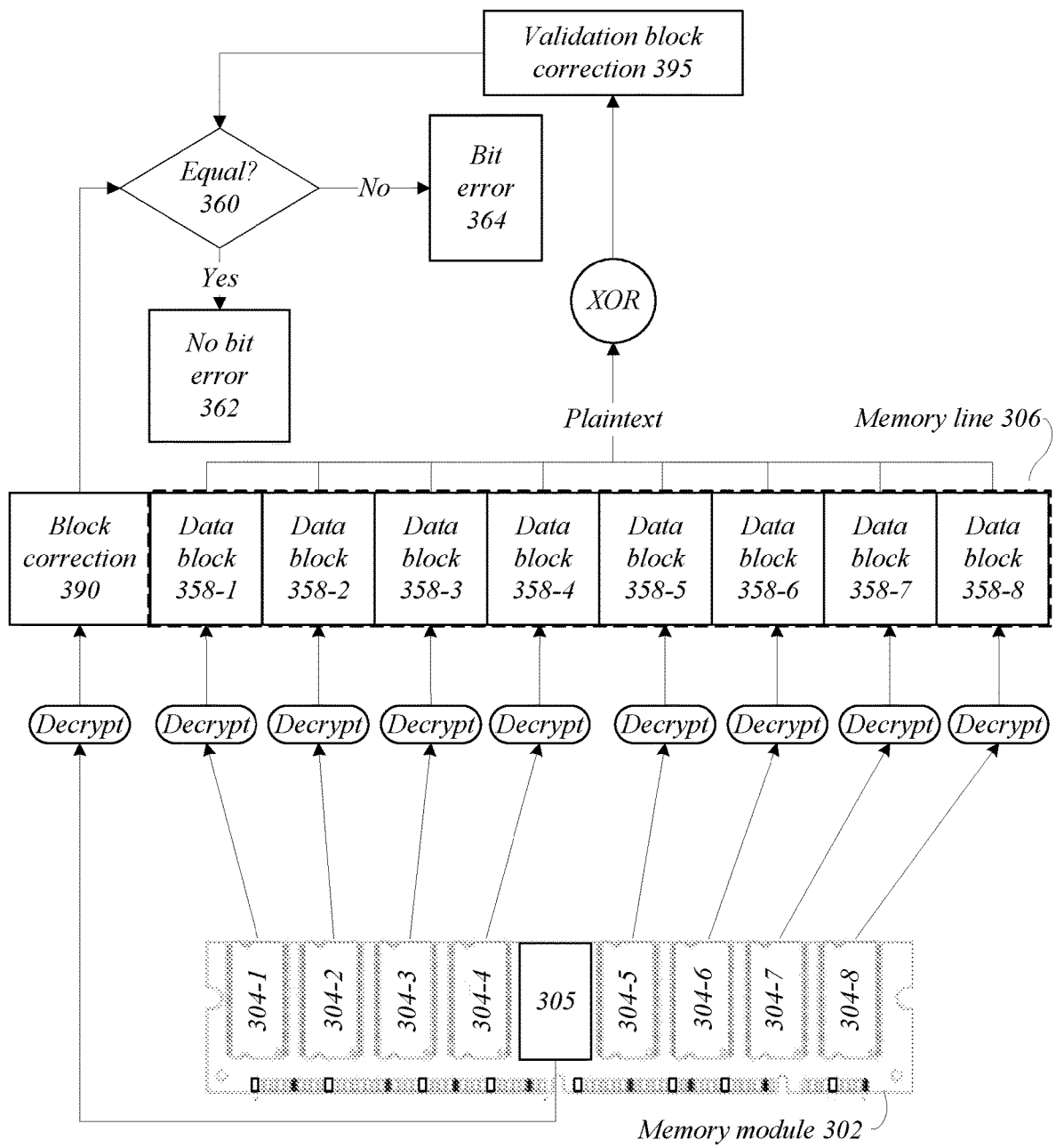
FIG. 3B illustrates an embodiment of a second processing flow.

FIG. 3B illustrates an example of a processing flow 300B that may be representative of a read flow from memory module 302. In various embodiments, one or more components of processing flow 300B may be the same or similar to one or more components in FIG. 1-FIG. 2. For instance, memory module 302 may be the same or similar to memory module 102, management memory device 305 may be the same or similar to management memory device 105, and memory line 306 may be the same or similar to memory line 106. In various embodiments, processing flow 300B may be implemented by logic circuitry and/or a DE manager, such as logic circuitry 110 and/or DE manager 112. In one or more embodiments described herein, data associated with memory line 306 (e.g., the data stored in memory module 302 as part of processing flow 300A) may be read or retrieved from memory module 302 and decrypted to generate block correction 390 and data blocks 358 or plaintext. In one or more such embodiments, the decrypted data blocks 358 may be used to generate a validation block correction 395 that is compared to the block correction 390 to verify integrity and/or correctness of the data. Embodiments are not limited in this context.

In some embodiments, each of decrypted data blocks 358 may be XORed together to generate XORed plaintext, which may be equivalent to the validation block correction 395. In some such embodiments, the block correction 390 and the validation block correction 395 may be compared to determine if they are equal at block 360. For instance, block correction 390 and validation block correction 395 may be compared by comparator 216. If the block correction 390 and the validation block correction 395 are equal, it may be determined that no bit error or data corruption has occurred at block 362. However, if the block correction 390 and the validation block correction 395 are not equal, it may be determined that one or more bit errors or data corruption has occurred at block 364. In various embodiments, when a bit error or data corruption is detected, then an error correction flow may be entered (see e.g., FIG. 4 and FIG. 5). In various such embodiments, error correction flows may generate XORed plaintext by excluding one of data blocks 358 at a time.

In various embodiments, error correction may involve testing each device one at a time in a trial and error approach. For instance, the devices may be tested beginning with data block 358-1 (corresponding to the decrypted bits from memory device 304-1). In several embodiments, to test if memory device 304-1 is in error, data blocks 358-2 through 358-8 can be XORed with the block correction 390 to produce a replacement value. The resulting replacement value may then be encrypted (e.g., using XTS with the tweak corresponding to the memory address for data block 358-1 and a secret key) to produce a calculated ciphertext replacement value which is compared to the corresponding ciphertext of memory device 304-1. For example, the calculated ciphertext replacement value and device 304-1 ciphertext may be XORed and the resulting number of bits set can be counted. In such examples, if the number of bits set to one is below a threshold number, then this is likely the device in error. When this occurs, the replacement value plaintext may then be used in place of data block 358-1 to send to the processor cache, and the calculated ciphertext may be updated in device 304-1 in an attempt to correct the error.

However, if the calculated ciphertext for the replacement value for data block 358-1 compared to the corresponding device 304-1 has more bits different than the threshold value, the next device may be tested. For example, to test memory device 304-2, the decrypted data block 358-1 and decrypted data blocks 358-3 through 358-8 may be XORed with the block correction 390. This replacement value may then be used in place of data block 358-2 and is encrypted. This calculated ciphertext replacement value may then be compared with the corresponding ciphertext bits from device 304-2. If the number of bits that are different is below the threshold value, then the likely erroneous device is found and the plaintext replacement value for data block 358-2 may be set to the processor cache and the ciphertext replacement value may be written back to device 304-2 in an attempt to fix the error. However, if the number of bits that are different between the ciphertext replacement value compared with the corresponding bits from device 304-2 exceeds the threshold value, then the next device (e.g., device 304-3) is similarly test, and so on through device 304-8.

When the last data bock 304-8 calculated ciphertext replacement value is tested against the last device by comparing with the corresponding ciphertext bits from memory device 304-8 without detecting an error, then none of the storage memory device are found to be in error. In response, a final test may be performed to see if the erroneous device is the management memory device 305. In the final test, all of the decrypted data blocks 358 may be XORed together to generate a plaintext replacement value. This plaintext replacement value may then be encrypted (e.g., using XTS where the tweak is the address of the block correction 390 and the secret key), and this ciphertext replacement value is compared with the corresponding ciphertext from the management memory device 305. If the number of bits that are different is less than the threshold value, then the management memory device is likely in error. In such instances, the ciphertext replacement value may then be written back to memory for device 305 in an attempt to correct the error, while data blocks 358-1 through 358-8 may be sent to the processor cache.

An example of the processing flow 300B for a 64-byte cache line with 64-bit data blocks may proceed as follows, such as in response to a cache miss. Each 64-bit block and the block correction may be retrieved from memory module 302 and decrypted (e.g., Simon/Speck) for the 64-byte memory/data/cache line. In various embodiments, data may be retrieved from memory module 302 through a memory controller. The plaintext for each decrypted block may then be combined (e.g., XORed) and then compared with the plaintext of the decrypted block correction. If these values match, the integrity may be verified and the read data line may be determined to not be corrupted/modified. Upon a determination that the data has not been corrupted, the data may be deemed suitable for forwarding to the processor cache.

Figure 4:
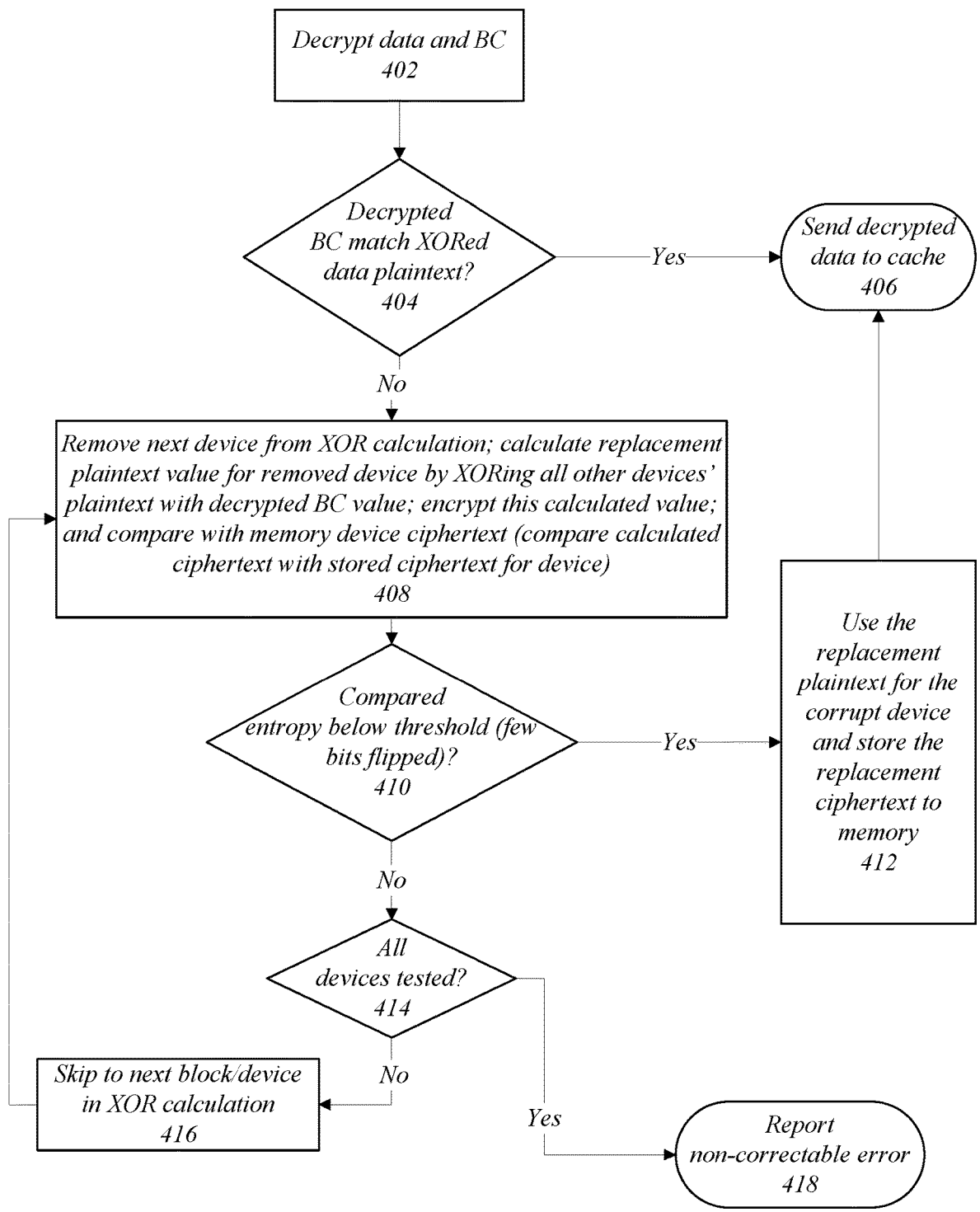
FIG. 4 illustrates an embodiment of a first logic flow.

FIG. 4 illustrates one embodiment of a logic flow 400, which may be representative of operations that may be executed in various embodiments in conjunction with detection and/or correcting data read from memory, such as memory module 102 or memory module 302. The logic flow 400 may be representative of some or all of the operations that may be executed by or implemented on one or more components of operating environments 100, 200 of FIG. 1-FIG. 2 or processing flows 300A, 300B of FIG. 3A-FIG. 3B, such as memory module 102, logic circuitry 110, or DE manager 112. The embodiments are not limited in this context.

In the illustrated embodiment shown in FIG. 4, the logic flow 400 may begin at block 402. At block 402 "decrypt data and BC" data from each storage memory device may be decrypted to produce data block plaintext and a block correction may be decrypted from a management memory device to produce BC plaintext. For example, data and a block correction retrieved from memory module 302 may be decrypted, such as with bit encoder/decoder 214 and/or a block cipher. In other examples, a bit decoder component may be used to decrypt the data and the block correction. In some embodiments, this operation may occur in response to a processor cache miss. Continuing to block 404, "decrypted BC match XORed data plaintext?" the decrypted BC may be compared to XORed data block plaintext. For instance, the decrypted data plaintext (e.g., data blocks 358) may be XORed together to produce XORed data plaintext. In various embodiments, the XORed data plaintext may be equivalent to the validation block correction 395. If the decrypted BC matches the XORed data block plaintext, then the logic flow may proceed to block 406. At block 406 "send decrypted data to cache" the decrypted data plaintext may be sent to the processor cache. For instance, decrypted data blocks 358 of memory line 306 may be sent to a processor cache. Referring back to block 404 "decrypted BC match XORed data plaintext?", if the decrypted BC does not match the XORed data block plaintext it may be determined that data corruption/modification has occurred and the logic flow 400 may proceed to block 408.

At block 408, the process of locating and/or correcting bit errors resulting from data corruption/modification may begin. Generally, the process of locating and/or correcting bit errors resulting from data corruption/modification may include substituting each device block, one at a time, by the BC correction value/replacement value until all the devices are checked. Further, the BC clock correction value may be calculated by XORing each plaintext data block (except for the substituted device (i.e. the device under test)) with the BC plaintext value. In various embodiments, this may work by re-encrypting the calculated plaintext using the BC correction value/replacement value (and the same secret key, if used) and comparing the resulting calculated ciphertext with ciphertext for the block retrieved from memory. Thus, at block 408, a memory device may be removed from BC calculation (e.g., XOR calculation) and a replacement plaintext value for the removed device may be calculated by XORing all other devices' plaintext with the decrypted BC value (e.g., block correction 390). The resulting value may then be encrypted and compared with the stored ciphertext for the removed device to determine an entropy between the two values. Thus, the recomputed replacement value (using the block correction) produces a ciphertext comparable to the stored ciphertext of the memory device under test. If the two ciphertext values are similar (e.g., just a few bits are different and under the threshold value), then probability indicates that this device was the erroneous device and the recomputed replacement value is the correct replacement value for it.

At block 410, if the entropy between the two values may be compared to a threshold, such as by comparator 216 to determine whether the entropy is low/small or high/large. If there is large entropy (entropy above threshold) between the two (e.g., ~50% of bits flipped without any identified patterns or clustering in the flipped bits), then this is not likely the corrupted device block. Accordingly, the process will determine if all devices have been tested at block 414. If all the device have not been tested, then at block 416 "skip to next bock/device in XOR calculation" the next block/device for testing will be identified and the logic flow 400 will return to block 408. In various embodiments, multiple blocks/devices may be tested in parallel. For instance, multiple memory devices may be tested in parallel, such as via logic replication or pipelining.

Referring back to block 410, if it is determined the calculated ciphertext compared to the stored device block ciphertext has small entropy, the device is likely the one that is faulty. For instance, small entropy may include one or more of number of flipped bits being below a threshold number, the flipped bits being together in a group or cluster within a threshold defined cluster size and/or alignment, or any combination of multiple thresholds for various measurements of the entropy of the compared ciphertexts. In such instances, the error may be corrected by using the calculated/replacement plaintext, which may be forwarded to the CPU cache at block 412. In some such instances, the calculated/replacement ciphertext may be updated in memory for the corrupt device to attempt to repair the stored corrupted data.

In many embodiments, large entropy may be any value at or above an entropy threshold and low entropy may be any value at or below the entropy threshold. In various embodiments, the entropy threshold may be adjustable or selectable, such as for the number of flipped bits from the ciphertext comparison. In some embodiments, multiple thresholds may be used, such as different thresholds for one or more of the following examples. Examples of low entropy can include one or more of a number of bits flipped being below the configurable threshold value, or the flipped bits may be patterned, periodic, or clustered (e.g., due to a bad wire or stuck-at-fault, half of the device bits matching exactly but the other half containing flipped bits, or the bits comprising the boundary of a bank are flipped), or the flipped bits are together in a group or cluster within a threshold defined cluster size and/or alignment, or any combination of multiple of these thresholds for various measurements of the entropy of the compared ciphertext. For instance, the threshold may be set based on usage/customer requirements. If none of the devices (i.e., memory devices) pass the entropy threshold (e.g., are below the entropy threshold), and it is determined that all of the devices have been tested at block 414 then the error may be deemed uncorrectable. This may result in the cache line being poisoned and/or an error being set to the CPU) at block 418.

In various embodiments, even the BC value (e.g., block correction 390) can be corrected by XORing all the data block plaintexts for a memory line together, and then using this value instead of the BC value, encrypting this value, and comparing this calculated value with the stored BC block ciphertext from a management memory device (e.g., management memory device 305). Again, if the entropy between the two values is low, then it is likely that the BC device (i.e. management memory device) has the failure and the calculated value may be used in place of the BC. In various embodiments, with the techniques described herein, any single bit error can be corrected and most multi-bit errors confined to a device may likewise be corrected. In some embodiments, the entropy of the data block plaintexts may be used to determine which order to test the memory devices. In some embodiments, this may be based on the insight that the plaintext data blocks with the highest entropy (more random looking) are more likely to be associated with the erroneous memory device. Additionally, and as will be described in more detail with respect to FIG. 5, simultaneous bit errors on multiple devices may also be identified and corrected.

Figure 5:
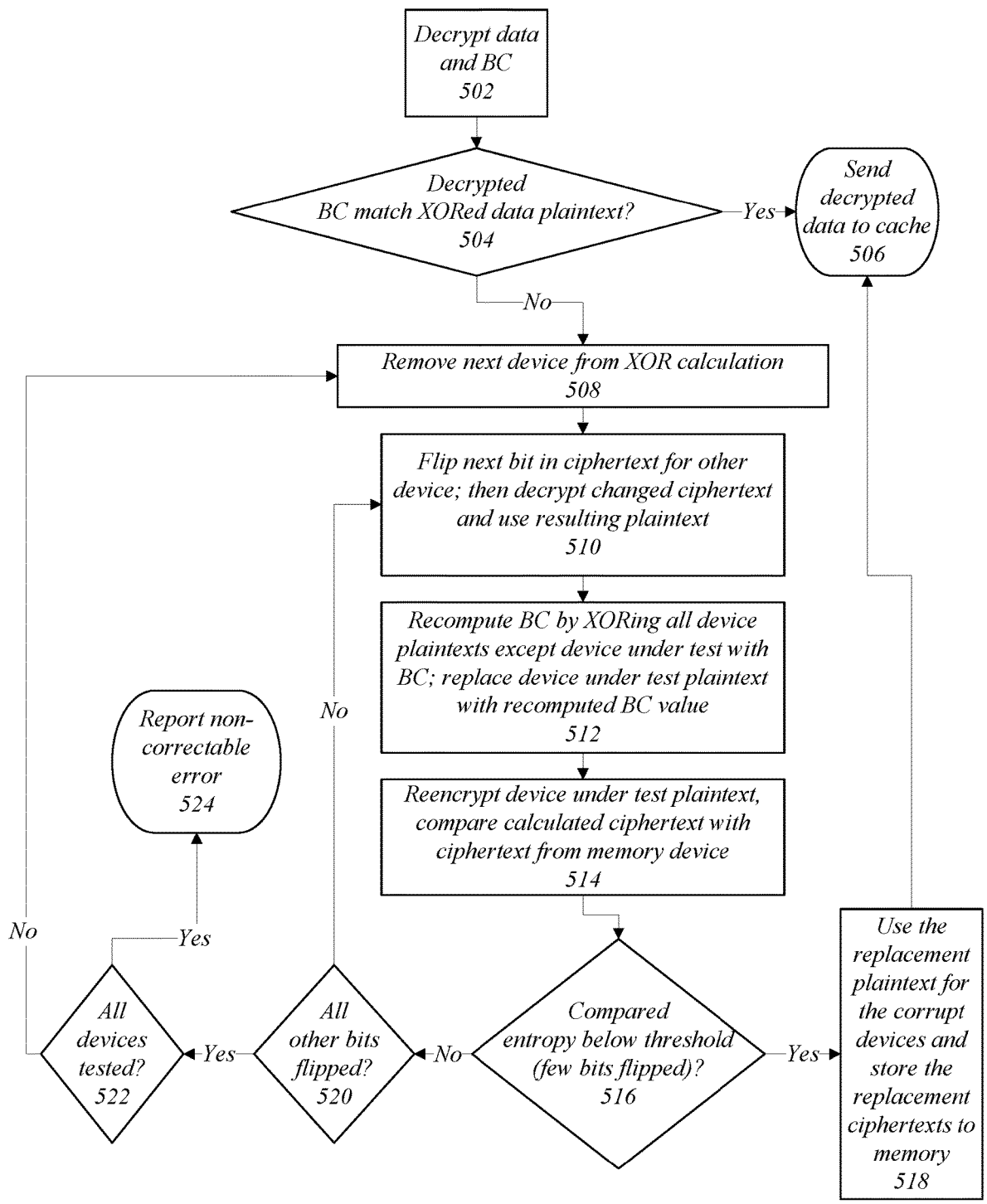
FIG. 5 illustrates an embodiment of a second logic flow.

FIG. 5 illustrates one embodiment of a logic flow 500, which may be representative of operations that may be executed in various embodiments in conjunction with detection and/or correcting data read from memory, such as memory module 102 or memory module 302. The logic flow 500 may be representative of some or all the operations that may be executed by or implemented on one or more components of operating environments 100, 200 of FIG. 1-FIG. 2 or processing flows 300A, 300B of FIG. 3A-FIG. 3B, such as memory module 102, logic circuitry 110, or DE manager 112. In many embodiments, logic flow 500 may be entered when logic flow 400 fails to identify a correctable error. For example, instead of logic flow 400 concluding at block 418 "report non-correctable error", logic flow 500 may be entered. The embodiments are not limited in this context.

In the illustrated embodiment shown in FIG. 5, the logic flow 500 may begin at block 502. At block 502 "decrypt data and BC" data and a block correction may be decrypted to produce BC plaintext and data plaintext. For example, data and a block correction retrieved from memory module 302 may be decrypted, such as with bit encoder/decoder 214 and/or a block cipher. In some embodiments, this operation may occur in response to a processor cache miss. Continuing to block 504, "decrypted BC match XORed data plaintext?" the decrypted BC may be compared to XORed data plaintext. For instance, the decrypted data plaintext (e.g., data blocks 358) may be XORed together to produce XORed data plaintext. In various embodiments, the XORed data plaintext may be equivalent to the validation block correction 395. If the decrypted BC matches the XORed data plaintext, then the logic flow may proceed to block 506. At block 506 "send decrypted data to cache" the decrypted data plaintext may be sent to cache memory. For instance, decrypted data blocks 358 of memory line 306 may be sent to a processor cache. Referring back to block 504 "decrypted BC match XORed data plaintext?", if the decrypted BC does not match the XORed data plaintext it may be determined that data corruption/modification has occurred and the logic flow 500 may proceed to block 508.

At block 508 "remove next device from XOR calculation" the next (or first) device may be removed from the XOR calculation. For example, storage memory device 304-1 may be removed from the XOR calculation. Continuing to block 510, the next bit (or first) bit in ciphertext for another device is flipped, the changed ciphertext is decrypted, and the resulting plaintext is utilized in block 512. At block 512, the block correction is recomputed by XORing all device plaintexts except the plaintext of the device under test with the originally computed block correction and the plaintext of the device under test is replaced with the plaintext of the recomputed block correction.

At block 514, the plaintext of the recomputed block correction is re-encrypted and the resulting ciphertext is compared with the ciphertext from the memory device. At block 516, if the entropy between the two values may be compared to a threshold, such as by comparator 216 to determine whether the entropy is low/small or high/large. If there is large entropy between the two (e.g., ~50% of bits flipped without any identified patterns in the flipped bits), then the errors are not likely to have been corrected and the logic flow 500 will proceed to block 520. At block 520 "all other bits flipped?" it will be determined if each of the other bits, one at the time, have been flipped. If all other bits have not been flipped, then the process will restore the previously flipped bit in the cipher text for the other device and return to block 510 where the next bit is flipped and the process is repeated until every bit for every device, except the device under test, has been flipped and tested. In this manner, logic flow 500 may enable detection of simultaneous bit errors on multiple devices. For instance, one device with multiple bit errors and another device with a single bit error may be corrected.

Referring back to block 516 "compared entropy below threshold?", if the entropy is low (e.g., only a few bits flipped or a pattern in the flipped bits), then the erroneous data has likely been identified. In such instances, the errors may be corrected by using the calculated/replacement plaintext, which may be forwarded to the CPU cache at block 518. In some such instances, the calculated/replacement ciphertext may be updated in memory for the corrupt devices to attempt to repair the stored corrupted data.

Referring back to block 520 "all other bits flipped?", if all the bits of each of the memory devices other than the memory device under test have been flipped, then logic flow 500 may proceed to block 522. At block 522 "all devices tested" it may be determined whether all the other devices have been tested (i.e. been the device under test). If all the other devices have not been tested then the logic flow 500 may proceed to block 508 where the data block of the next device is removed from the XOR calculation, becoming the device under test, and the process repeats. However, if all the other devices have been tested, then a non-correctable error may be reported at block 524. Other embodiments, may continue testing (e.g. flipping 2-bit combinations in the other devices) before reporting an error. In other such embodiments, testing may continue with flipping up to n-bit combinations. For example, the number of bits flipped may be increased until it is deemed impractical/undesirable due to the considerable number of calculations required and/or resulting security integrity strength degradation.

Figure 6A:
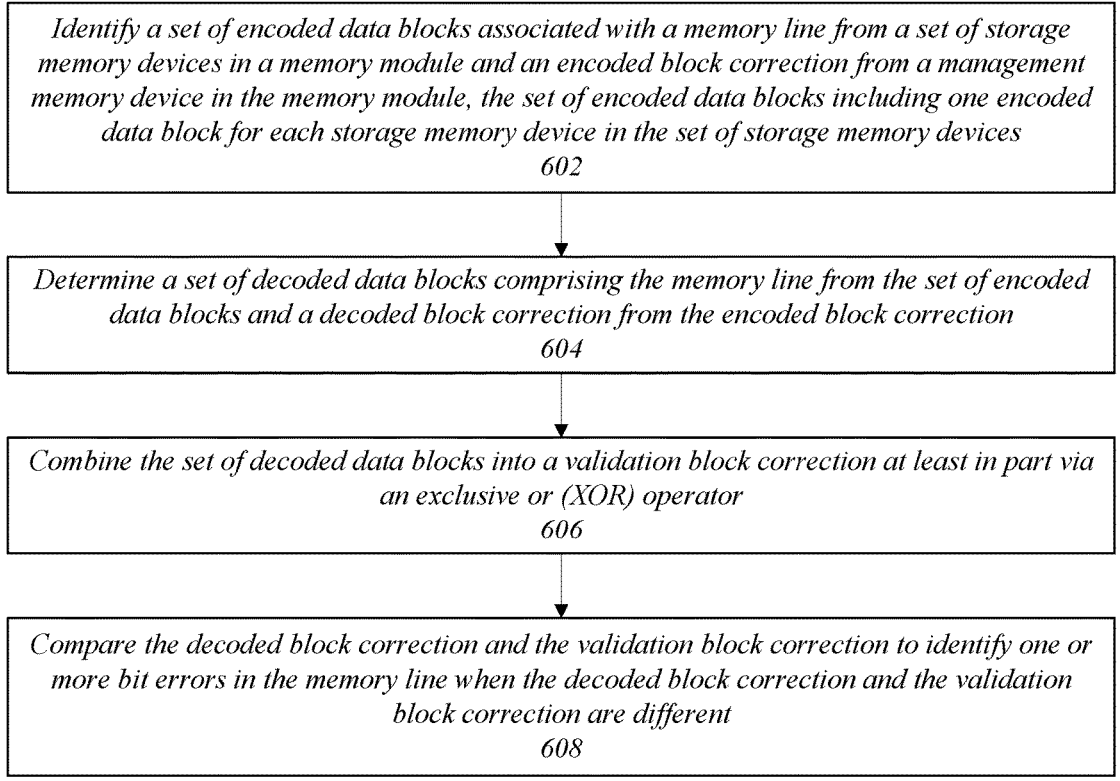
FIG. 6A illustrates an embodiment of a third logic flow.

FIG. 6A illustrates one embodiment of a logic flow 600, which may be representative of operations that may be executed in various embodiments in conjunction with detection and/or correcting data read from memory, such as memory module 102 or memory module 302. The logic flow 600 may be representative of some or all the operations that may be executed by or implemented on one or more components of operating environments 100, 200 of FIG. 1-FIG. 2 or processing flows 300A, 300B of FIG. 3A-FIG. 3B, such as memory module 102, logic circuitry 110, or DE manager 112. The embodiments are not limited in this context.

In the illustrated embodiment shown in FIG. 6A, the logic flow 600 may begin at block 602. At block 602 "identify a set of encoded data blocks associated with a memory line from a set of storage memory devices in a memory module and an encoded block correction from a management memory device in the memory module, the set of encoded data blocks including one encoded data block for each storage memory device in the set of storage memory devices" a set of encoded data blocks associated with a memory line from a set of storage memory devices in a memory module and an encoded block correction from a management memory device in the memory module may be identified. For instance, DE manager 112 may identify the set of encoded data blocks stored in memory module 102 and associated with memory line 106. In the illustrated embodiment, the set of encoded data blocks may include one encoded data block for each storage memory device in the set of storage memory devices. For example, each of the storage memory devices 104 may be used to store one encoded data block in the set of encoded data blocks.

Continuing to block 604 "determine a set of decoded data blocks comprising the memory line from the set of encoded data blocks and a decoded block correction from the encoded block correction" a set of decoded data blocks comprising the memory line from the set of encoded data blocks and a decoded block correction from the encoded block correction may be determined. For instance, data blocks 358 and block correction 390 may be decrypted from memory module 302. At block 606 "combine the set of decoded data blocks into a validation block correction at least in part via an exclusive or (XOR) operator" the set of decoded data blocks may be combined in to a validation block at least in part via an XOR operator. For example, data blocks 358 may be combined into validation block correction 395.

Proceeding to block 608 "compare the decoded block correction and the validation block correction to identify one or more bit errors in the memory line when the decoded block correction and the validation block correction are different" the decoded block correction and the validation block correction may be compared to identify one or more bit errors in the memory line when the decoded block correction and the validation block correction are different. For example, comparator 216 may identify a bit error when block correction 390 and validation block correction 395 are not equal.

FIG. 6B illustrates one embodiment of a logic flow 650, which may be representative of operations that may be executed in various embodiments in conjunction with detection and/or correcting data read from memory, such as memory module 102 or memory module 302. The logic flow 650 may be representative of some or all the operations that may be executed by or implemented on one or more components of operating environments 100, 200 of FIG. 1-FIG. 2 or processing flows 300A, 300B of FIGS. 3A-FIG. 3B, such as memory module 102, logic circuitry 110, or DE manager 112. The embodiments are not limited in this context.

In the illustrated embodiment shown in FIG. 6B, the logic flow 650 may begin at block 652. At block 652 "identify a memory line comprising a set of data blocks to store in a set of storage memory devices included in a memory module, the set of data blocks including one data block for each storage memory device in the set of storage memory devices" a memory line comprising a set of data blocks to store in a set of storage memory device included in a memory module may be identified. For instance, memory line 106 comprising data block 108 may be identified to store in storage memory devices 104 of memory module 102. In the illustrated embodiment, the set of data blocks may include one data block for each storage memory device in the set of storage memory devices.

Continuing to block 654 "combine the set of data blocks into a block correction at least in part via an exclusive or (XOR) operator" the set of data blocks may be combined into a block correction at least in part via an XOR operator. For example, data blocks 308 may be combined into block correction 340 by BC generator 218. At block 656 "determine an encoded block correction from the block correction with a bit encoder" an encoded block correction may be determined from the block correction with a bit encoder. For instance, bit encoder/decoder 214 may encrypt block correction 340 to determine an encoded block correction. Proceeding to block 658 "store the encoded block correction in a management memory device included in the memory module" the encoded block correction may be stored in a management memory device included in the memory module. For example, the encoded block correction may be stored in management memory device 105.

Figure 7:
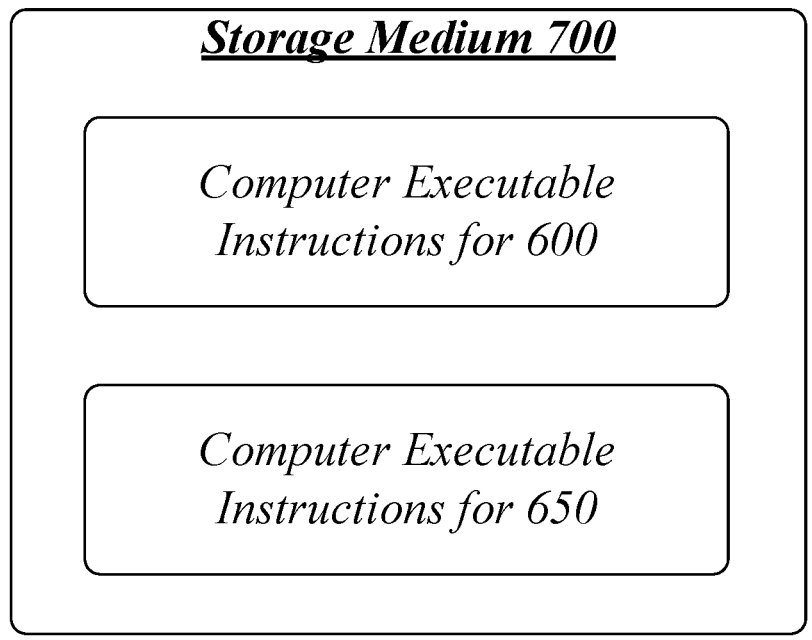
FIG. 7 illustrates an embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to processing flows 300A, 300B of FIGS. 3A-FIG. 3B and logic flows 400, 500, 600, and 650 of FIGS. 4-6B. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
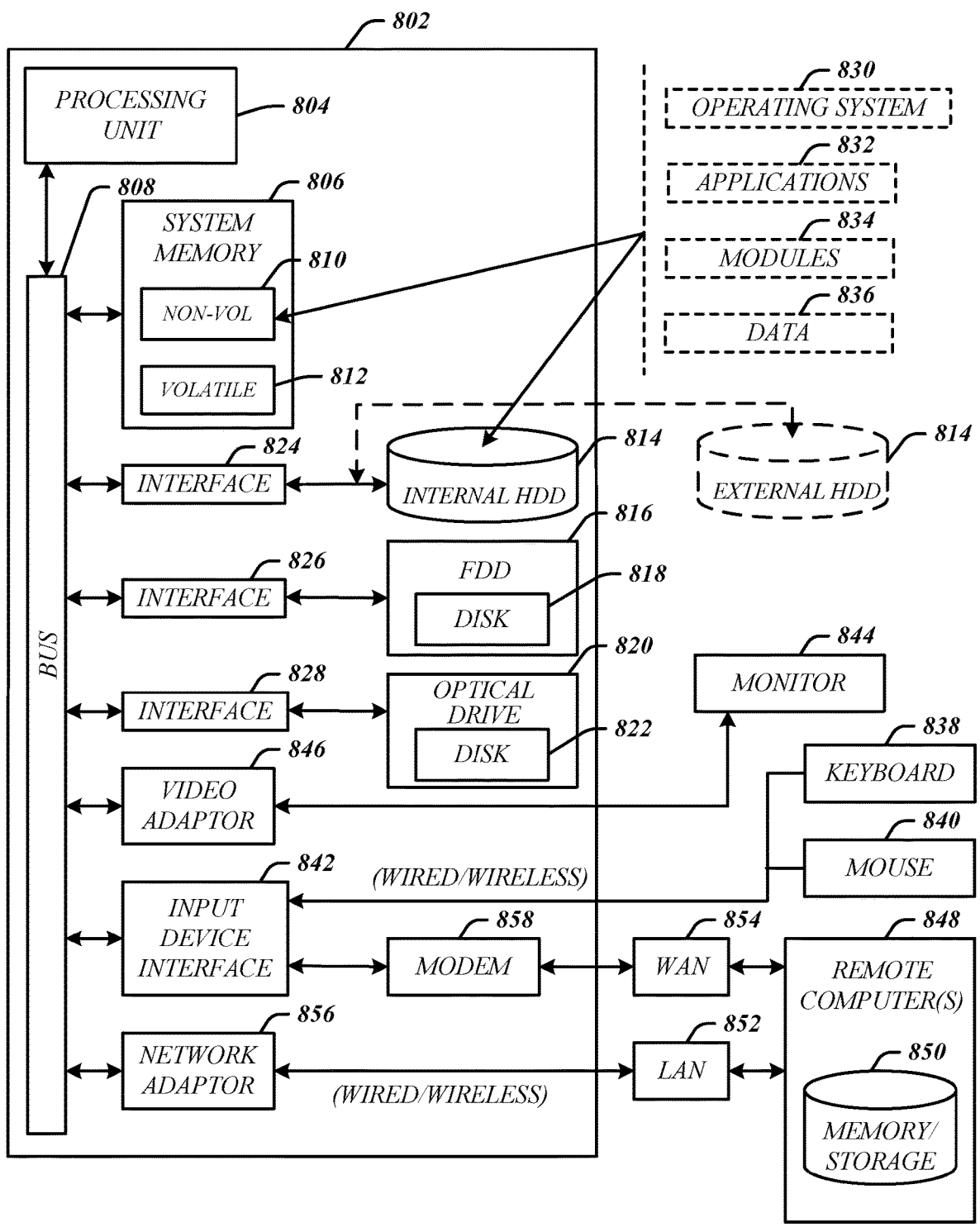
FIG. 8 illustrates an embodiment of a computing architecture.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a computer system that implements one or more components of operating environment 100 of FIG. 1 and/or operating environment 200 of FIG. 2. In some embodiments, computing architecture 800 may be representative, for example, one or more portions of memory module 102 and/or correction manager 112 that implement one or more embodiments described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of logic circuitry 110, such as correction manager 110. In various embodiments, one or more of the memory units 810, 812 may be the same or similar as memory module 102.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 1358, or is connected to a communications server on the WAN 1354, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
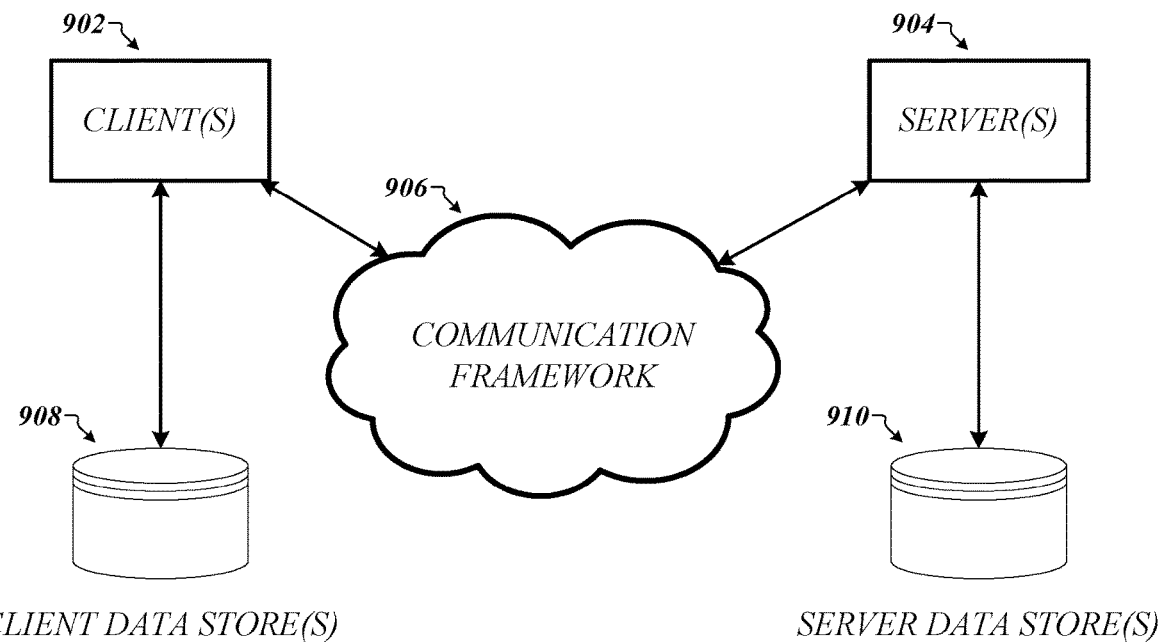
FIG. 9 illustrates an embodiment of a communications architecture.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, comprising: a memory module comprising a set of storage memory devices and a management memory device; and logic for a data error manager, at least a portion of the logic implemented in circuitry, the logic to: identify a set of encoded data blocks associated with a memory line from the set of storage memory devices and an encoded block correction from the management memory device, the set of encoded data blocks including one encoded data block for each storage memory device in the set of storage memory devices; determine a set of decoded data blocks comprising the memory line from the set of encoded data blocks and a decoded block correction from the encoded block correction; combine the set of decoded data blocks into a validation block correction at least in part via an exclusive or (XOR) operator; and compare the decoded block correction and the validation block correction to identify one or more bit errors in the memory line when the decoded block correction and the validation block correction are different.

Example 2 includes the subject matter of Example 1, wherein the set of encoded/decoded data blocks comprises a first encoded/decoded data block and a first encoded/decoded block correction associated with a first storage memory device in the set of storage memory devices and a second encoded/decoded data block and a second encoded/decoded block correction associated with a second storage memory device in the set of storage memory devices, and the logic to: combine the first decoded data block and the first decoded block correction to generate a replacement value for the second decoded data block at least in part via the XOR operator; encode the replacement value for the second decoded data block; and determine an entropy between the encoded second data block and the encoded replacement value for the second decoded data block to identify when the second storage memory device is a source of at least one of the one or more bit errors.

Example 3 includes the subject matter of Example 2, the logic to determine the entropy based on a number of bit values that differ between the second encoded data block and the encoded replacement value for the second data block.

Example 4 includes the subject matter of Example 2, the logic to determine the entropy based on a pattern or clustering in bit values that differ between the second encoded data block and the encoded replacement value for the second decoded data block.

Example 5 includes the subject matter of Example 2, the logic to replace the second encoded data block with the encoded replacement value for the second encoded data block in the second memory device when the second storage memory device is the source of at least one of the one or more bit errors.

Example 6 includes the subject matter of Example 2, the logic to: combine the second decoded data block and the decoded block correction to generate a respective replacement value for the first decoded data block when the second storage memory device is not identified as the source of at least one of the one or more bit errors; encode the respective replacement value for the first decoded data block; and determine an entropy between the first encoded data block and the encoded respective replacement value for the first data block to identify when the first storage memory device is a source of at least one of the one or more bit errors.

Example 7 includes the subject matter of Example 1, wherein the set of encoded/decoded data blocks comprises a first encoded/decoded data block and a first encoded/decoded block correction associated with a first storage memory device in the set of storage memory devices and a second encoded/decoded data block and a second encoded/decoded block correction associated with a second storage memory device in the set of storage memory devices, and the logic to: flip a first bit in the first encoded data block to produce a first encoded test value; determine a first decoded test value based on the first encoded test value; combine the first decoded test value with the first decoded block correction generate a replacement value for the second decoded data block at least in part via the XOR operator; encode the replacement value for the second decoded data block; and determine an entropy between the encoded second data block and the encoded replacement value for the second decoded data block to identify when a combination of the first and second storage memory devices are a source of at least one of the one or more bit errors.

Example 8 includes the subject matter of Example 1, wherein the set of encoded/decoded data blocks comprises a first encoded/decoded data block associated with a first storage memory device in the set of storage memory devices and a second encoded/decoded data block associated with a second storage memory device in the set of storage memory devices, and the logic to: combine the first decoded data block and the second decoded data block to generate a replacement value for the decoded block correction at least in part via the XOR operator; encode the replacement value for the second decoded data block; and determine an entropy between the encoded block correction and the encoded replacement value for the block correction to identify the management memory device as a source of at least one of the one or more bit errors.

Example 9 includes the subject matter of Example 1, the logic to utilize a decryption algorithm to determine the set of decoded data blocks comprising the memory line from the set of encoded data blocks and the decoded block correction from the encoded block correction.

Example 10 includes the subject matter of Example 9, the decryption algorithm comprising a block cipher with an input size equal to a bit size of individual encoded data blocks in the set of data blocks.

Example 11 includes the subject matter of Example 10, the decryption algorithm to decode a respective encoded data block based on an address of the respective encoded data block.

Example 12 includes the subject matter of Example 10, the decryption algorithm to decode a respective encoded data block based on a key.

Example 13 includes the subject matter of Example 12, the logic to identify the key based on metadata or address bits.

Example 14 includes the subject matter of Example 1, wherein a bit size of the decoded block correction equals a bit size of individual decoded data blocks in the set of decoded data bocks.

Example 15 includes the subject matter of Example 1, wherein the set of storage memory devices and the management memory device include a common type of memory device.

Example 16 includes the subject matter of Example 1, wherein each data block in the set of data blocks comprises a row of the memory line.

Example 17 is at least one non-transitory computer-readable medium comprising a set of instructions that, in response to being executed by a processor circuit, cause the processor circuit to: identify a set of encoded data blocks associated with a memory line from a set of storage memory devices in a memory module and an encoded block correction from a management memory device in the memory module, the set of encoded data blocks including one encoded data block for each storage memory device in the set of storage memory devices; determine a set of decoded data blocks comprising the memory line from the set of encoded data blocks and a decoded block correction from the encoded block correction; combine the set of decoded data blocks into a validation block correction at least in part via an exclusive or (XOR) operator; and compare the decoded block correction and the validation block correction to identify one or more bit errors in the memory line when the decoded block correction and the validation block correction are different.

Example 18 includes the subject matter of Example 17, wherein the set of encoded/decoded data blocks comprises a first encoded/decoded data block and a first encoded/decoded block correction associated with a first storage memory device in the set of storage memory devices and a second encoded/decoded data block and a second encoded/decoded block correction associated with a second storage memory device in the set of storage memory devices, and comprising instructions that, in response to being executed by the processor circuit, cause the processor circuit to: combine the first decoded data block and the first decoded block correction to generate a replacement value for the second decoded data block at least in part via the XOR operator; encode the replacement value for the second decoded data block; and determine an entropy between the encoded second data block and the encoded replacement value for the second decoded data block to identify when the second storage memory device is a source of at least one of the one or more bit errors.

Example 19 includes the subject matter of Example 18, comprising instructions that, in response to being executed by the processor circuit, cause the processor circuit to determine the entropy based on a number of bit values that differ between the second encoded data block and the encoded replacement value for the second data block.

Example 20 includes the subject matter of Example 18, comprising instructions that, in response to being executed by the processor circuit, cause the processor circuit to determine the entropy based on a pattern or clustering in bit values that differ between the second encoded data block and the encoded replacement value for the second decoded data block.

Example 21 includes the subject matter of Example 18, comprising instructions that, in response to being executed by the processor circuit, cause the processor circuit to replace the second encoded data block with the encoded replacement value for the second encoded data block in the second memory device when the second storage memory device is the source of at least one of the one or more bit errors.

Example 22 includes the subject matter of Example 18, comprising instructions that, in response to being executed by the processor circuit, cause the processor circuit to: combine the second decoded data block and the decoded block correction to generate a respective replacement value for the first decoded data block when the second storage memory device is not identified as the source of at least one of the one or more bit errors; encode the respective replacement value for the first decoded data block; and determine an entropy between the first encoded data block and the encoded respective replacement value for the first data block to identify when the first storage memory device is a source of at least one of the one or more bit errors.

Example 23 includes the subject matter of Example 17, wherein the set of encoded/decoded data blocks comprises a first encoded/decoded data block and a first encoded/decoded block correction associated with a first storage memory device in the set of storage memory devices and a second encoded/decoded data block and a second encoded/decoded block correction associated with a second storage memory device in the set of storage memory devices, and comprising instructions that, in response to being executed by the processor circuit, cause the processor circuit to: flip a first bit in the first encoded data block to produce a first encoded test value; determine a first decoded test value based on the first encoded test value; combine the first decoded test value with the first decoded block correction generate a replacement value for the second decoded data block at least in part via the XOR operator; encode the replacement value for the second decoded data block; and determine an entropy between the encoded second data block and the encoded replacement value for the second decoded data block to identify when a combination of the first and second storage memory devices are a source of at least one of the one or more bit errors.

Example 24 includes the subject matter of Example 17, wherein the set of encoded/decoded data blocks comprises a first encoded/decoded data block associated with a first storage memory device in the set of storage memory devices and a second encoded/decoded data block associated with a second storage memory device in the set of storage memory devices, and comprising instructions that, in response to being executed by the processor circuit, cause the processor circuit to: combine the first decoded data block and the second decoded data block to generate a replacement value for the decoded block correction at least in part via the XOR operator; encode the replacement value for the second decoded data block; and determine an entropy between the encoded block correction and the encoded replacement value for the block correction to identify the management memory device as a source of at least one of the one or more bit errors.

Example 25 includes the subject matter of Example 17, comprising instructions that, in response to being executed by the processor circuit, cause the processor circuit to utilize a decryption algorithm to determine the set of decoded data blocks comprising the memory line from the set of encoded data blocks and the decoded block correction from the encoded block correction.

Example 26 includes the subject matter of Example 25, the decryption algorithm comprising a block cipher with an input size equal to a bit size of individual encoded data blocks in the set of data blocks.

Example 27 includes the subject matter of Example 26, the decryption algorithm to decode a respective encoded data block based on an address of the respective encoded data block.

Example 28 includes the subject matter of Example 26, the decryption algorithm to decode a respective encoded data block based on a key.

Example 29 includes the subject matter of Example 28, comprising instructions that, in response to being executed by the processor circuit, cause the processor circuit to identify the key based on metadata or address bits.

Example 30 includes the subject matter of Example 17, wherein a bit size of the decoded block correction equals a bit size of individual decoded data blocks in the set of decoded data bocks.

Example 31 includes the subject matter of Example 17, wherein the set of storage memory devices and the management memory device include a common type of memory device.

Example 32 includes the subject matter of Example 17, wherein each data block in the set of data blocks comprises a row of the memory line.

Example 33 is a method, comprising: identifying a set of encoded data blocks associated with a memory line from a set of storage memory devices in a memory module and an encoded block correction from a management memory device in the memory module, the set of encoded data blocks including one encoded data block for each storage memory device in the set of storage memory devices; determining a set of decoded data blocks comprising the memory line from the set of encoded data blocks and a decoded block correction from the encoded block correction; combining the set of decoded data blocks into a validation block correction at least in part via an exclusive or (XOR) operator; and comparing the decoded block correction and the validation block correction to identify one or more bit errors in the memory line when the decoded block correction and the validation block correction are different.

Example 34 includes the subject matter of Example 33, wherein the set of encoded/decoded data blocks comprises a first encoded/decoded data block and a first encoded/decoded block correction associated with a first storage memory device in the set of storage memory devices and a second encoded/decoded data block and a second encoded/decoded block correction associated with a second storage memory device in the set of storage memory devices, and comprising: combining the first decoded data block and the first decoded block correction to generate a replacement value for the second decoded data block at least in part via the XOR operator; encoding the replacement value for the second decoded data block; and determining an entropy between the encoded second data block and the encoded replacement value for the second decoded data block to identify when the second storage memory device is a source of at least one of the one or more bit errors.

Example 35 includes the subject matter of Example 34, comprising determining the entropy based on a number of bit values that differ between the second encoded data block and the encoded replacement value for the second data block.

Example 36 includes the subject matter of Example 34, comprising determining the entropy based on a pattern or clustering in bit values that differ between the second encoded data block and the encoded replacement value for the second decoded data block.

Example 37 includes the subject matter of Example 34, comprising replacing the second encoded data block with the encoded replacement value for the second encoded data block in the second memory device when the second storage memory device is the source of at least one of the one or more bit errors.

Example 38 includes the subject matter of Example 34, comprising: combining the second decoded data block and the decoded block correction to generate a respective replacement value for the first decoded data block when the second storage memory device is not identified as the source of at least one of the one or more bit errors; encoding the respective replacement value for the first decoded data block; and determining an entropy between the first encoded data block and the encoded respective replacement value for the first data block to identify when the first storage memory device is a source of at least one of the one or more bit errors.

Example 39 includes the subject matter of Example 33, wherein the set of encoded/decoded data blocks comprises a first encoded/decoded data block and a first encoded/decoded block correction associated with a first storage memory device in the set of storage memory devices and a second encoded/decoded data block and a second encoded/decoded block correction associated with a second storage memory device in the set of storage memory devices, and comprising: flipping a first bit in the first encoded data block to produce a first encoded test value; determining a first decoded test value based on the first encoded test value; combining the first decoded test value with the first decoded block correction generate a replacement value for the second decoded data block at least in part via the XOR operator; encoding the replacement value for the second decoded data block; and determining an entropy between the encoded second data block and the encoded replacement value for the second decoded data block to identify when a combination of the first and second storage memory devices are a source of at least one of the one or more bit errors.

Example 40 includes the subject matter of Example 33, wherein the set of encoded/decoded data blocks comprises a first encoded/decoded data block associated with a first storage memory device in the set of storage memory devices and a second encoded/decoded data block associated with a second storage memory device in the set of storage memory devices, and comprising: combining the first decoded data block and the second decoded data block to generate a replacement value for the decoded block correction at least in part via the XOR operator; encoding the replacement value for the second decoded data block; and determining an entropy between the encoded block correction and the encoded replacement value for the block correction to identify the management memory device as a source of at least one of the one or more bit errors.

Example 41 includes the subject matter of Example 33, comprising utilizing a decryption algorithm to determine the set of decoded data blocks comprising the memory line from the set of encoded data blocks and the decoded block correction from the encoded block correction.

Example 42 includes the subject matter of Example 41, the decryption algorithm comprising a block cipher with an input size equal to a bit size of individual encoded data blocks in the set of data blocks.

Example 43 includes the subject matter of Example 42, the decryption algorithm to decode a respective encoded data block based on an address of the respective encoded data block.

Example 44 includes the subject matter of Example 42, the decryption algorithm to decode a respective encoded data block based on a key.

Example 45 includes the subject matter of Example 44, comprising identifying the key based on metadata or address bits.

Example 46 includes the subject matter of Example 33, wherein a bit size of the decoded block correction equals a bit size of individual decoded data blocks in the set of decoded data bocks.

Example 47 includes the subject matter of Example 33, wherein the set of storage memory devices and the management memory device include a common type of memory device.

Example 48 includes the subject matter of Example 33, wherein each data block in the set of data blocks comprises a row of the memory line.

Example 49 is an apparatus, comprising: a memory module comprising a set of storage memory devices and a management memory device; and logic, at least a portion of the logic implemented in circuitry, the logic to: identify a memory line comprising a set of data blocks to store in the memory module, the set of data blocks including one data block for each storage memory device in the set of storage memory devices; combine the set of data blocks into a block correction at least in part via an exclusive or (XOR) operator; determine an encoded block correction from the block correction with a bit encoder; and store the encoded block correction in the management memory device.

Example 50 includes the subject matter of Example 49, the logic to: generate a set of encoded data blocks; and store each encoded data block in the set of encoded data blocks in a different storage memory device in the set of storage memory devices.

Example 51 includes the subject matter of Example 50, the bit encoder to utilize an encryption algorithm to generate the set of encoded data blocks.

Example 52 includes the subject matter of Example 51, the encryption algorithm comprising a block cipher with an input size equal to a bit size of individual data blocks in the set of data blocks.

Example 53 includes the subject matter of Example 52, the encryption algorithm to encode a respective data block in the set of data blocks based on an address associated with the respective data block.

Example 54 includes the subject matter of Example 52, the encryption algorithm to encode a respective data block based on a key.

Example 55 includes the subject matter of Example 54, the logic to identify the key based on metadata or address bits.

Example 56 includes the subject matter of Example 49, wherein the set of storage memory devices and the management memory device include a common type of memory device.

Example 57 includes the subject matter of Example 49, an input size of the bit encoder equal to a bit size of the data block.

Example 58 includes the subject matter of Example 49, wherein each data block in the set of data blocks comprises a row of the memory line.

Example 59 includes the subject matter of Example 49, the memory line comprising a cache line.

Example 60 at least one non-transitory computer-readable medium comprising a set of instructions that, in response to being executed by a processor circuit, cause the processor circuit to: identify a memory line comprising a set of data blocks to store in a set of storage memory devices included in a memory module, the set of data blocks including one data block for each storage memory device in the set of storage memory devices; combine the set of data blocks into a block correction at least in part via an exclusive or (XOR) operator; determine an encoded block correction from the block correction with a bit encoder; and store the encoded block correction in a management memory device included in the memory module.

Example 61 includes the subject matter of Example 60, comprising instructions that, in response to being executed by the processor circuit, cause the processor circuit to: generate a set of encoded data blocks; and store each encoded data block in the set of encoded data blocks in a different storage memory device in the set of storage memory devices.

Example 62 includes the subject matter of Example 61, the bit encoder to utilize an encryption algorithm to generate the set of encoded data blocks.

Example 63 includes the subject matter of Example 62, the encryption algorithm comprising a block cipher with an input size equal to a bit size of individual data blocks in the set of data blocks.

Example 64 includes the subject matter of Example 63, the encryption algorithm to encode a respective data block in the set of data blocks based on an address associated with the respective data block.

Example 65 includes the subject matter of Example 63, the encryption algorithm to encode a respective data block based on a key.

Example 66 includes the subject matter of Example 65, comprising instructions that, in response to being executed by the processor circuit, cause the processor circuit to identify the key based on metadata or address bits.

Example 67 includes the subject matter of Example 60, wherein the set of storage memory devices and the management memory device include a common type of memory device.

Example 68 includes the subject matter of Example 60, an input size of the bit encoder equal to a bit size of the data block.

Example 69 includes the subject matter of Example 60, wherein each data block in the set of data blocks comprises a row of the memory line.

Example 70 includes the subject matter of Example 60, the memory line comprising a cache line.

Example 71 is a method, comprising: identifying a memory line comprising a set of data blocks to store in a set of storage memory devices included in a memory module, the set of data blocks including one data block for each storage memory device in the set of storage memory devices; combining the set of data blocks into a block correction at least in part via an exclusive or (XOR) operator; determining an encoded block correction from the block correction with a bit encoder; and storing the encoded block correction in a management memory device included in the memory module Example 72 includes the subject matter of Example 71, comprising: generating a set of encoded data blocks; and storing each encoded data block in the set of encoded data blocks in a different storage memory device in the set of storage memory devices.

Example 73 includes the subject matter of Example 72, the bit encoder to utilize an encryption algorithm to generate the set of encoded data blocks.

Example 74 includes the subject matter of Example 73, the encryption algorithm comprising a block cipher with an input size equal to a bit size of individual data blocks in the set of data blocks.

Example 75 includes the subject matter of Example 74, the encryption algorithm to encode a respective data block in the set of data blocks based on an address associated with the respective data block.

Example 76 includes the subject matter of Example 74, the encryption algorithm to encode a respective data block based on a key.

Example 77 includes the subject matter of Example 76, comprising identifying the key based on metadata or address bits.

Example 78 includes the subject matter of Example 71, wherein the set of storage memory devices and the management memory device include a common type of memory device.

Example 79 includes the subject matter of Example 71, an input size of the bit encoder equal to a bit size of the data block.

Example 80 includes the subject matter of Example 71, wherein each data block in the set of data blocks comprises a row of the memory line.

Example 81 includes the subject matter of Example 71, the memory line comprising a cache line.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
   memory comprising instructions; and
   circuitry coupled to the memory and arranged to execute the instructions, which cause the circuitry to:
   retrieve a set of encoded data blocks associated with a memory line from a set of storage memory devices, the set of encoded data blocks including one encoded data block for each storage memory device in the set of storage memory devices,
   retrieve an encoded block correction from a management memory device associated with the set of storage memory devices,
   determine a set of decoded data blocks from the set of encoded data blocks,
   determine a decoded block correction from the encoded block correction,
   combine the set of decoded data blocks into a validation block correction at least in part via an exclusive or (XOR) operator, and
   compare the decoded block correction and the validation block correction to identify one or more bit errors in the memory line when the decoded block correction and the validation block correction are different.

2. The apparatus of claim 1, wherein the set of encoded data blocks and corresponding decoded data blocks comprise a first encoded data block and corresponding decoded data block and a first encoded block correction and corresponding decoded block correction associated with a first storage memory device in the set of storage memory devices and a second encoded block correction and corresponding decoded data block and a second encoded block correction and corresponding decoded block correction associated with a second storage memory device in the set of storage memory devices, and the circuitry in executing the instructions caused to:
   combine the first decoded data block and the first decoded block correction to generate a replacement value for the second decoded data block at least in part via the XOR operator;
   encode the replacement value for the second decoded data block; and
   determine an entropy between the encoded second data block and the encoded replacement value for the second decoded data block to identify when the second storage memory device is a source of at least one of the one or more bit errors.

3. The apparatus of claim 2, the circuitry in executing the instructions caused to determine the entropy based on a number of bit values that differ between the second encoded data block and the encoded replacement value for the second data block.

4. The apparatus of claim 2, the circuitry in executing the instructions caused to determine the entropy based on a pattern or clustering in bit values that differ between the second encoded data block and the encoded replacement value for the second decoded data block.

5. The apparatus of claim 2, the circuitry in executing the instructions caused to replace the second encoded data block with the encoded replacement value for the second encoded data block in the second memory device when the second storage memory device is the source of at least one of the one or more bit errors.

6. The apparatus of claim 2, the circuitry in executing the instructions caused to:
   combine the second decoded data block and the decoded block correction to generate a respective replacement value for the first decoded data block when the second storage memory device is not identified as the source of at least one of the one or more bit errors;
   encode the respective replacement value for the first decoded data block; and
   determine an entropy between the first encoded data block and the encoded respective replacement value for the first data block to identify when the first storage memory device is a source of at least one of the one or more bit errors.

7. The apparatus of claim 1, wherein the set of encoded block correction and corresponding decoded data blocks comprises a first encoded block correction and corresponding decoded data block and a first encoded/decoded block correction associated with a first storage memory device in the set of storage memory devices and a second encoded block correction and corresponding decoded data block and a second encoded block correction and corresponding decoded block correction associated with a second storage memory device in the set of storage memory devices, and the circuitry in executing the instructions caused to:

flip a first bit in the first encoded data block to produce a first encoded test value;
determine a first decoded test value based on the first encoded test value;
combine the first decoded test value with the first decoded block correction generate a replacement value for the second decoded data block at least in part via the XOR operator;
encode the replacement value for the second decoded data block; and
determine an entropy between the encoded second data block and the encoded replacement value for the second decoded data block to identify when a combination of the first and second storage memory devices are a source of at least one of the one or more bit errors.

8. The apparatus of claim 1, wherein the set of encoded block correction and corresponding decoded data blocks comprises a first encoded block correction and corresponding decoded data block associated with a first storage memory device in the set of storage memory devices and a second encoded/decoded data block associated with a second storage memory device in the set of storage memory devices, and the circuitry in executing the instructions caused to:
combine the first decoded data block and the second decoded data block to generate a replacement value for the decoded block correction at least in part via the XOR operator;
encode the replacement value for the second decoded data block; and
determine an entropy between the encoded block correction and the encoded replacement value for the block correction to identify the management memory device as a source of at least one of the one or more bit errors.

9. The apparatus of claim 1, the circuitry in executing the instructions caused to utilize a decryption algorithm to determine the set of decoded data blocks comprising the memory line from the set of encoded data blocks and the decoded block correction from the encoded block correction.

10. The apparatus of claim 9, the decryption algorithm comprising a block cipher with an input size equal to a bit size of individual encoded data blocks in the set of data blocks.

11. The apparatus of claim 10, the decryption algorithm to decode a respective encoded data block based on an address of the respective encoded data block.

12. The apparatus of claim 10, the decryption algorithm to decode a respective encoded data block based on a key.

13. The apparatus of claim 12, the circuitry in executing the instructions caused to identify the key based on metadata or address bits.

14. The apparatus of claim 1, comprising the set of storage memory devices and the management memory device and wherein the set of storage memory devices and the management memory device include a common type of memory device.

15. The apparatus of claim 1, wherein each data block in the set of data blocks comprises a row of the memory line.

16. A method, comprising:
retrieving a set of encoded data blocks associated with a memory line from a set of storage memory devices in a memory module and an encoded block correction from a management memory device in the memory module, the set of encoded data blocks including one encoded data block for each storage memory device in the set of storage memory devices;
determining a set of decoded data blocks comprising the memory line from the set of encoded data blocks and a decoded block correction from the encoded block correction;
combining the set of decoded data blocks into a validation block correction at least in part via an exclusive or (XOR) operator; and
comparing the decoded block correction and the validation block correction to identify one or more bit errors in the memory line when the decoded block correction and the validation block correction are different.

17. The method of claim 16, wherein the set of encoded block correction and corresponding decoded data blocks comprises a first encoded block correction and corresponding decoded data block and a first encoded/decoded block correction associated with a first storage memory device in the set of storage memory devices and a second encoded block correction and corresponding decoded data block and a second encoded block correction and corresponding decoded block correction associated with a second storage memory device in the set of storage memory devices, and comprising:
combining the first decoded data block and the first decoded block correction to generate a replacement value for the second decoded data block at least in part via the XOR operator;
encoding the replacement value for the second decoded data block; and
determining an entropy between the encoded second data block and the encoded replacement value for the second decoded data block to identify when the second storage memory device is a source of at least one of the one or more bit errors.

18. The method of claim 17, comprising determining the entropy based on a number of bit values that differ between the second encoded data block and the encoded replacement value for the second data block.

19. The method of claim 17, comprising determining the entropy based on a pattern or clustering in bit values that differ between the second encoded data block and the encoded replacement value for the second decoded data block.

20. The method of claim 17, comprising replacing the second encoded data block with the encoded replacement value for the second encoded data block in the second memory device when the second storage memory device is the source of at least one of the one or more bit errors.

21. At least one non-transitory computer-readable medium comprising a set of instructions that, in response to being executed by a processor circuit, cause the processor circuit to:
identify a memory line comprising a set of data blocks to store in a set of storage memory devices included in a memory module, the set of data blocks including one data block for each storage memory device in the set of storage memory devices;
combine the set of data blocks into a block correction at least in part via an exclusive or (XOR) operator;
determine an encoded block correction from the block correction with a bit encoder; and
store the encoded block correction in a management memory device included in the memory module.

22. The at least one non-transitory computer-readable medium of claim 21, comprising instructions that, in response to being executed by the processor circuit, cause the processor circuit to:
  generate a set of encoded data blocks; and
  store each encoded data block in the set of encoded data blocks in a different storage memory device in the set of storage memory devices.

23. The at least one non-transitory computer-readable medium of claim 22, the bit encoder to utilize an encryption algorithm to generate the set of encoded data blocks.

24. The at least one non-transitory computer-readable medium of claim 23, the encryption algorithm comprising a block cipher with an input size equal to a bit size of individual data blocks in the set of data blocks.

25. The at least one non-transitory computer-readable medium of claim 24, the encryption algorithm to encode a respective data block in the set of data blocks based on an address associated with the respective data block.

* * * * *